F. B. MOUDY.
BOLT AND RIVET CUTTER.
APPLICATION FILED JAN. 5, 1914. RENEWED OCT. 21, 1916.
1,207,601.
Patented Dec. 5, 1916.
2 SHEETS—SHEET 2.
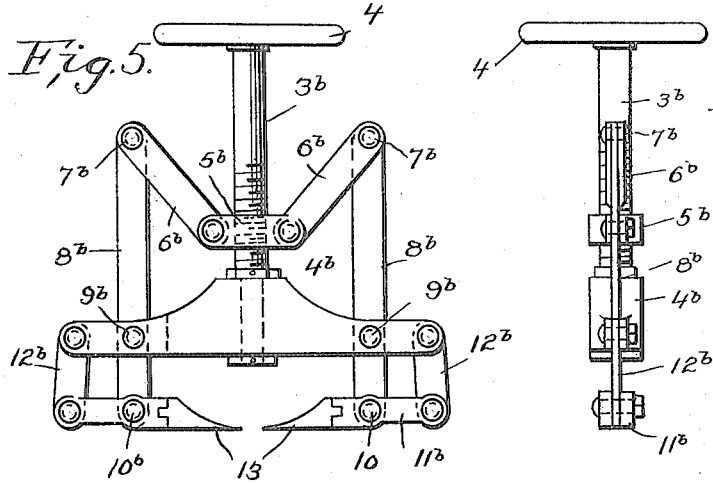
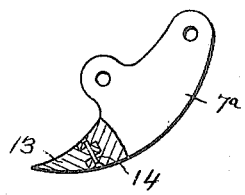
Fig. 7.
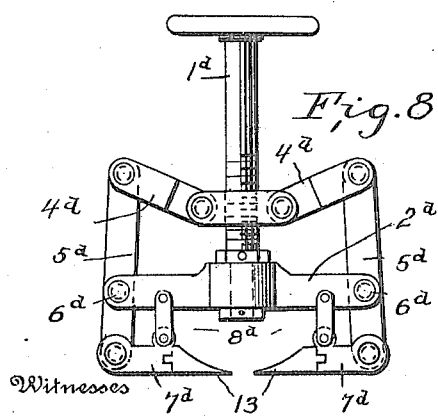
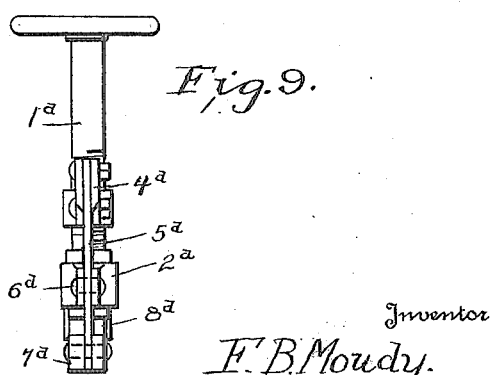
Witnesses
RN Jones
Inventor
F. B. Moudy.
By R. Randolph Jr.
Attorney

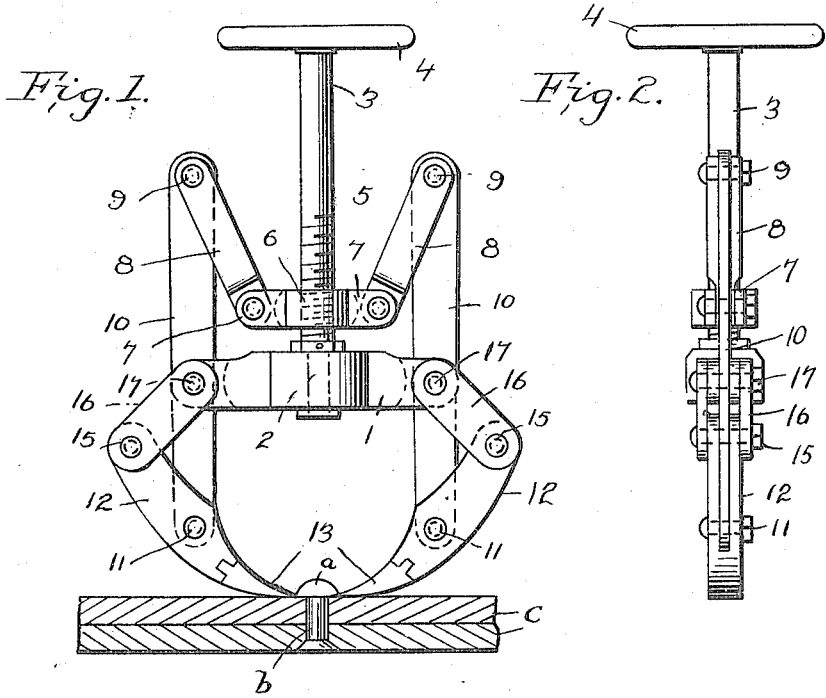
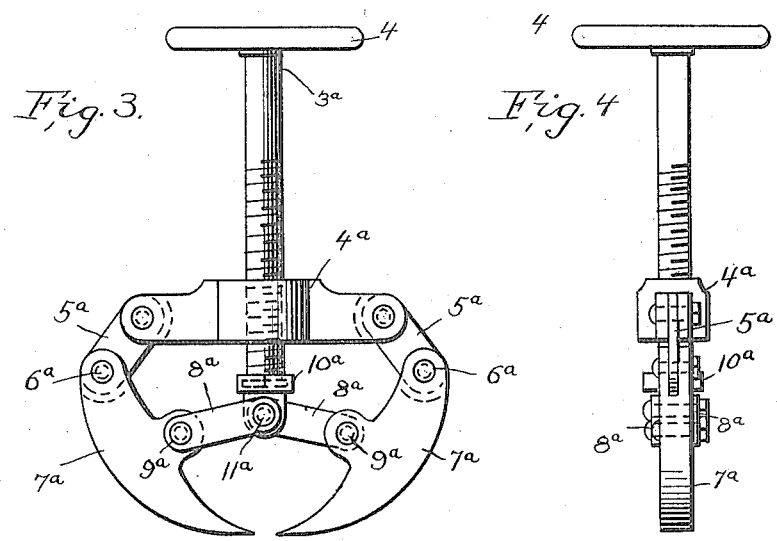

UNITED STATES PATENT OFFICE.

FREDERICK B. MOUDY, OF PORTAGE, PENNSYLVANIA.

BOLT AND RIVET CUTTER.

1,207,601.                    Specification of Letters Patent.        Patented Dec. 5, 1916.

Application filed January 5, 1914, Serial No. 810,447.  Renewed October 21, 1916.  Serial No. 127,038.

*To all whom it may concern:*

Be it known that I, FREDERICK B. MOUDY, a citizen of the United States, residing at Portage, in the county of Cambria and State of Pennsylvania, have invented certain new and useful Improvements in Bolt and Rivet Cutters; and I do hereby declare the following to be a full, clear, and exact description of the invention, such as will enable others skilled in the art to which it appertains to make and use the same.

This invention relates to bolt or rivet cutters, and one of the principal objects of the invention is to provide a reliable and efficient means for cutting a bolt or rivet immediately under the head or adjacent to the nut with a view to removing the rivet or bolt.

Another object of the invention is to provide a rivet cutter comprising a pair of cutter members and means for forcibly crowding the edges of the cutters underneath the head of the rivet and for severing the shank of the rivet adjacent to the head, so that the rivet can be readily driven out, when for any purpose it is found necessary to remove a rivet or to disconnect the parts that are riveted together.

These and other objects may be attained by means of the construction illustrated in the accompanying drawings in which—

Figure 1 is a side elevation of a rivet cutter made in accordance with this invention and shown engaging a rivet immediately under the head in position to cut the shank of the rivet, Fig. 2 is an edge view of the same, Fig. 3 is a side elevation of a slightly modified form of bolt or rivet cutter, Fig. 4 is an edge view of the same, Fig. 5 is a side elevation of a still further modified form of the invention, Fig. 6 is an edge view of the same, Fig. 7 is a detail view of one of the cutters or cutter members which are adapted to be secured and operated by any of the cutters shown. Fig. 8 is a still further modification of a rivet cutter made in accordance with this invention, and Fig. 9 is an edge view of the same.

Referring to the drawings, the numeral 1 designates a crosshead, in which the reduced end 2 of a hand screw 3 is mounted to rotate. The screw 3 is provided with a hand wheel 4, and the threaded portion 5 of the screw is mounted in a threaded opening in a traveling nut 6 having oppositely disposed lugs 7 to which are connected pivoted links 8, the upper end of said links being pivotally connected at 9 to parallel levers 10. The lower ends of the levers 10 are pivoted at 11 to the cutter holders or members 12. The members 12 are provided each with a dovetail groove in the lower ends thereof, and mounted in said grooves is a cutter 13, preferably held in place by means of a pin 14, as shown in Fig. 8 of the drawings. The cutter members 12 are pivotally connected at 15 to short links 16, and said links are pivoted at 17 to the crosshead 1.

By turning the hand wheel 4, the cutters 13 are forced underneath the head $a$ of a rivet $b$, secured in wood or metal articles $c$, and by turning the hand wheel 4, the cutters will sever the head $a$ from the rivet and permit the latter to be driven out to separate the parts of the article $c$, or to permit the insertion of a new rivet or bolt.

The rivet or bolt cutter, shown in Figs. 3 and 4, is somewhat simplified, and comprises a hand operating screw $3^a$ having a threaded connection with the traveling crosshead $4^a$. Pivotally connected to the outer end of the crosshead $4^a$ are links $5^a$ which are pivotally connected at their opposite ends at $6^a$ to the cutters. On the end of the screw $3^a$ is a swivel connection $10^a$, and links $8^a$ are pivoted at $9^a$ to the cutters $7^a$ and to the swivel connection $10^a$.

Referring to Figs. 5 and 6, the screw $3^b$ is mounted to rotate in the crosshead $4^b$ and a traveling nut $5^b$ is in threaded engagement with the screw $3^b$, said nut having pivoted links $6^b$ connected thereto and said links being pivotally connected at $7^b$ to levers $8^b$. The levers $8^b$ are pivoted at $9^b$ to the crosshead $4^b$ and at their ends are pivoted at $10^b$ to the cutter holders $11^b$. Links $12^b$ are pivotally connected at their opposite ends to the crosshead $4^b$ and the cutter holders $11^b$.

The modification shown in Figs. 9 and 10, comprises a screw $1^d$ mounted to rotate in a crosshead $2^d$ and provided with a traveling collar or nut $3^d$ to which are pivotally connected links $4^d$. Said links are pivotally connected to levers $5^d$. The levers $5^d$ are pivotally connected at $6^d$ to the crosshead $2^d$ and the ends of said levers $5^d$ are pivotally connected to the cutter holders $7^d$. Suitable springs $8^d$ connected to the crosshead $2^d$ bear upon the cutters to hold them down to their work.

From the foregoing it will be obvious that rivets or bolts may be quickly severed and removed by means of this invention by positioning the cutters upon opposite sides of the heads of the rivet or bolt and by moving the cutters together by means of the screw operated by the hand wheel 4.

Various changes in the details of construction may be resorted to without departing from the spirit and scope of the invention as defined in the claims.

What is claimed is:—

1. A rivet and bolt cutter comprising an operating screw, a crosshead and a traveler mounted on said screw, a pair of cutters, links connected to said cutters and to said crosshead, links pivoted to said traveler, and connections between said last mentioned links and said cutters.

2. A rivet and bolt cutter comprising a screw having a hand lever thereon, a cross head mounted on said screw, a traveler mounted on said screw, oppositely disposed cutters, links pivoted to said crosshead and to said cutters, links pivoted to said traveler, and levers pivoted to said links, said levers being pivoted to said cutters.

In testimony whereof I affix my signature in presence of two witnesses.

FRED. B. MOUDY.

Witnesses:
E. F. GREEN,
T. F. CAMPBELL.

Copies of this patent may be obtained for five cents each, by addressing the "Commissioner of Patents, Washington, D. C."